United States Patent [19]

Liu et al.

[11] 4,024,650
[45] May 24, 1977

[54] EDUCATIONAL TOY

[76] Inventors: Hsing-ching Liu; Lan-dih Liu, both of 3F, No. 213, Chung Ching North Road Sec. 4, Taipei, China /Taiwan

[22] Filed: Jan. 30, 1976

[21] Appl. No.: 653,789

[52] U.S. Cl. .................................................. 35/9 R
[51] Int. Cl.² .......................................... G09B 3/10
[58] Field of Search .............. 35/9 R, 9 B, 9 C, 9 D

[56] References Cited

UNITED STATES PATENTS

| | | | |
|---|---|---|---|
| 479,534 | 7/1892 | Snaman, Jr. | 35/9 R |
| 2,909,851 | 10/1959 | Haddock | 35/9 R |
| 3,122,844 | 3/1964 | Kharasch et al. | 35/9 B |
| 3,181,252 | 5/1965 | Goldschmidt et al. | 35/9 R |
| 3,675,341 | 7/1972 | Matsumoto | 35/9 B |

*Primary Examiner*—William H. Grieb

[57] ABSTRACT

An educational toy comprising a case, a plurality of changeable question and answer combination cards with notched longitudinal edges, a series of question actuating means and a series of corresponding answer actuating means, an indication mechanism composed of an affirmative indicator and a negative indicator, a series of question setting plates horizontally displaceable arranged beneath the corresponding question actuating means and having at their undersides at least two ribs with different inclined bottom surfaces, a series of answer setting plates connected at the bottoms of the corresponding answer actuating means and vertically displaceable together therewith, a movable board having a series of wedge-shaped posts along one side to be in selective cooperation with one of the said inclined ribs to set the position of the board and a series of supports laterally extended away from the board, and a pair of rods transversely supported at the free ends of the said supports and each having radially extended a series of L-shaped levers to be in selective cooperation with the said answer setting plates so as to raise up either the said affirmative indicator or the said negative indicator.

9 Claims, 6 Drawing Figures

EDUCATIONAL TOY

The present invention relates to an educational toy, and more particularly, to an improvement in the educational toy as disclosed in our co-pending applications Nos. 614,519 and 602,964 filed Sept. 18, 1975 and Aug. 8, 1975, respectively.

The educational toy according to the present invention comprises a case, a plurality of changeable question and answer combination cards with notched longitudinal edges, a series of question actuating means and a series of corresponding answer actuating means, an indication mechanism composed of an affirmative indicator and a negative indicator, a series of question setting plates horizontally displaceable arranged beneath the corresponding question actuating means and having at their undersides at least two ribs with different inclined bottom surfaces, a series of answer setting plates connected at the bottoms of the corresponding answer actuating means and vertically displaceable together therewith, a movable board having a series of wedge-shaped posts along one side to be in selective cooperation with one of the said inclined ribs to set the position of the board and a series of supports laterally extended away from the board, and a pair of rods transversely supported at the free ends of the said supports and each having radially extended a series of L-shaped levers to be in selective cooperation with the said answer setting plates so as to raise up either the said affirmative indicator or the said negative indicator.

Thus, it is the main object of the present invention to provide an afore-mentioned educational toy suitable to be played by a pupil in lower a class or even in kindergarten, and being great fun as well as achieving readily an effective educational result.

Other objects and advantages will become apparent from the following description with reference to the accompanying drawings, in which.

Figure 1:
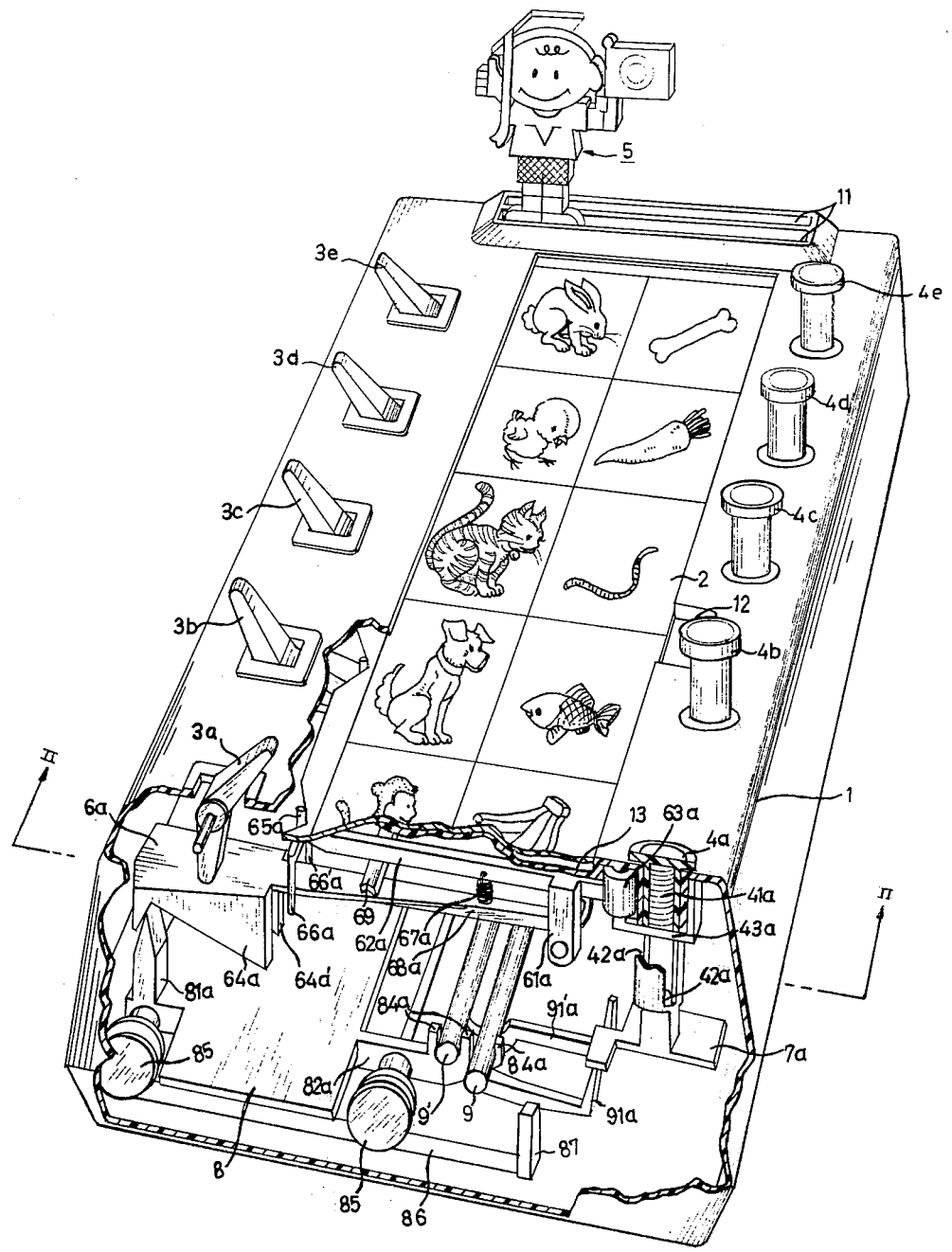
FIG. 1 is a perspective view of a preferred embodiment according to the present invention, with parts broken away.

Now, with reference to the drawings, the educational toy according to present invention mainly comprises a case 1, a question and answer card 2, a series of question actuating means 3a to 3e, a series of answer actuating means 4a to 4e, an indication mechanism 5, a series of question setting plates 6a to 6e, a series of answer setting plates 7a to 7e, a movable board 8 and a pair of rods 9 and 9'.

The case 1 as shown in FIG. 1 has an elongated box configuration, but other variable types are also available, and the invention is not limited to the illustrated model. On the rear end of the case 1, there are two transverse slots 11 for allowing either an affirmative or a negative indicator to arise uprightly, as referred to hereinafter. The case 1 provides at the right-hand side a cutout 12 for readily placing and removing the card 2.

Figure 6:
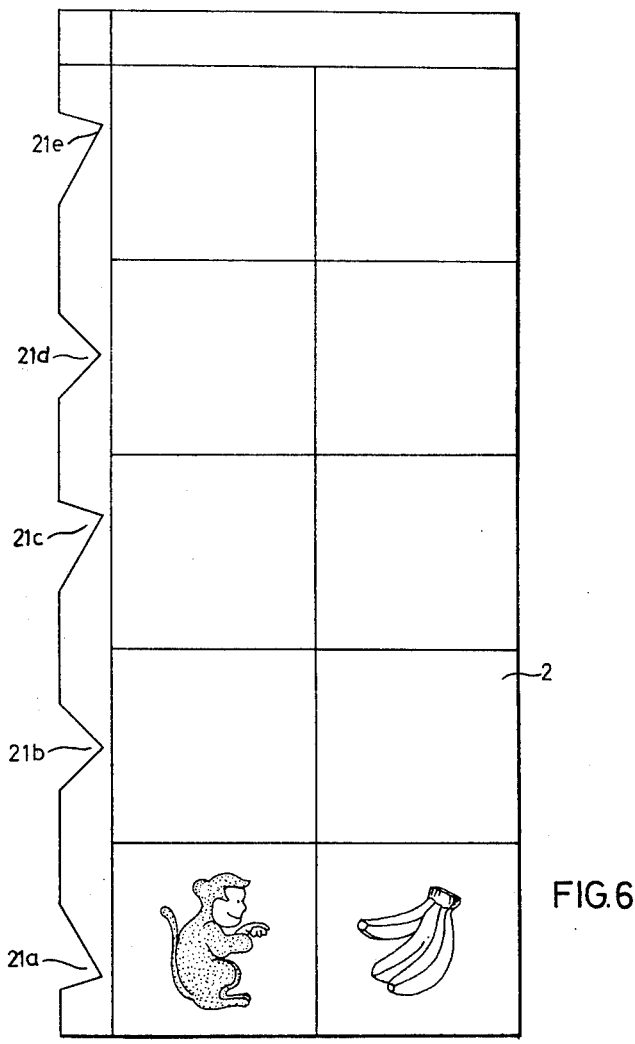
FIG. 6 is a plan view of an embodiment of a notched card eliminating the illustration of all questions and answers.

The question and answer card 2 is removably placed on the central top portion 13 of the case 1. The card 2 as shown is only one of an unlimited variation, each of which is well designed and printed with a number of questions, for example, at the left column, and corresponding answers, at the right column. The card 2, as best shown in FIG. 6, has notches 21a to 21e along its left longitudinal side, namely, there is one notch 21 corresponding to a respective question. The position of each notch may be varied between frontwards (21a), central (21b, 21d) and rearwards (21c, 21e) with respect to each question in order to displace and set the question setting plates 6a to 6e in position, as referred to hereinafter.

The series of question actuating means 3a to 3e are arranged along, for example, the left-hand longitudinal side of the case 1, and are in the form of wing-type switches, which is clearly illustrated by 3a.

The series of answer actuating means 4a to 4e are correspondingly arranged along another, for example, the right-hand longitudinal side of the case 1 and are in the form of push rods. A spring coil 41a . . . is retained within the hollow space of each push rod 4a . . . The wall of each rod 4a . . . is provided with two opposite slits 42a . . . extended longitudinally. A pressed bar 43a . . . passes through the said two slits 42a . . . to restrict the lower end of the said spring coil 41a . . . The bar 43a . . . is mounted on the case 1 at both ends.

Figure 3:
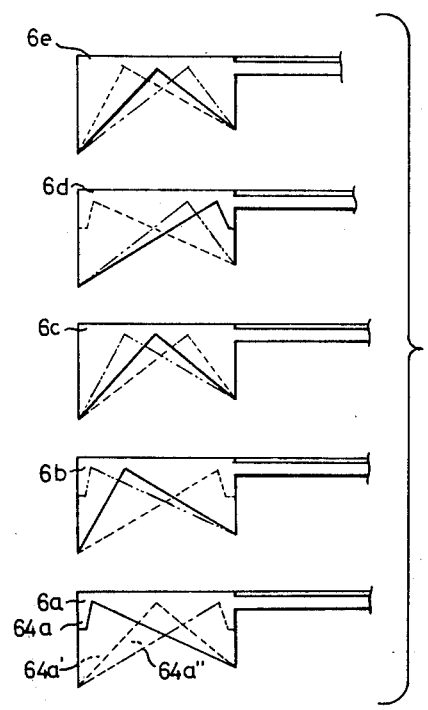
FIG. 3 is a side view of the question setting plate illustrating different predetermined configurations of ribs.
Figure 4:
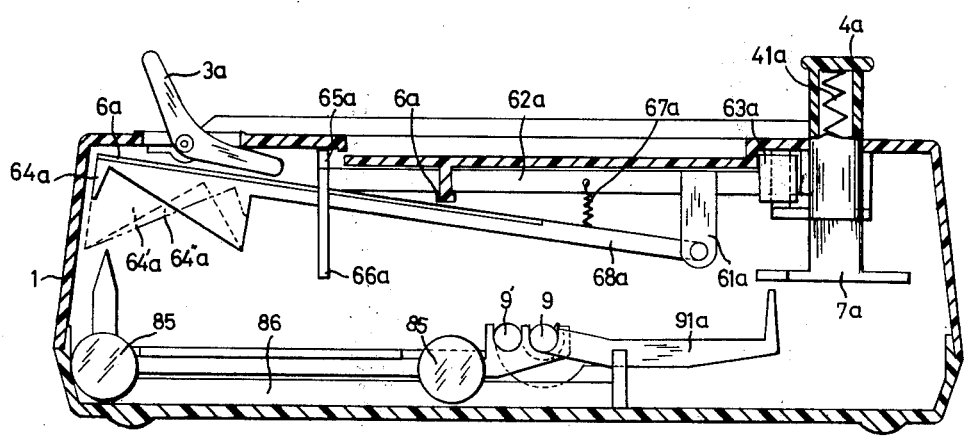
FIG. 4 is a transverse cross-sectional view of FIG. 1.
Figure 5:
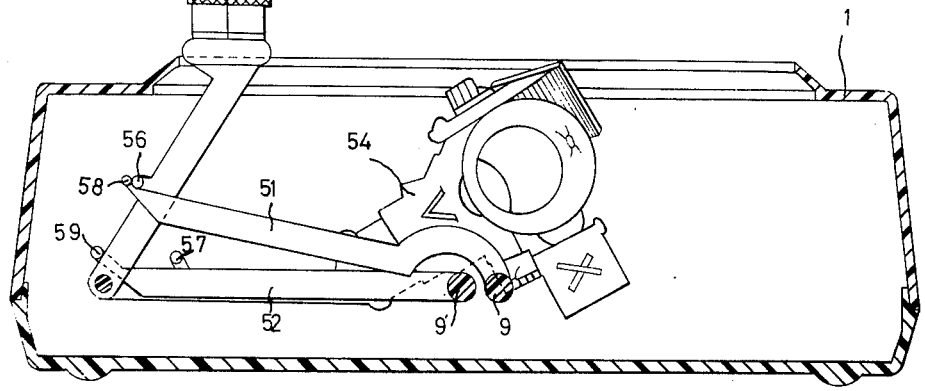
FIG. 5 is a transverse cross-sectional view at the rear side of FIG. 1 for illustrating the indication mechanism.

The question setting plate 6a, as the other plates 6b to 6e, is connected to a support 61a which depends from an arm 62a. The arm 62a is pivotably connected at one end to a bush 63a which is mounted on a support that supports the afore-mentioned bar 43a. The plate 6a has at its underside at least two ribs 64a, and three ribs 64a, 64'a and 64"a are shown in the illustrative embodiment, as best seen from FIG. 3 indicated by a solid line, a dash line, and a dash-and-dotted line, respectively. The ribs 64a, 64'a and 64"a have different inclined bottom surfaces to form various predetermined configurations. These configurations are not only different between ribs of the same plate 6a, but also among different plates 6a to 6e.

The arm 62a is provided at its free end with an upwardly raised guide pin 65a and two downwardly extended restriction pins 66a and 66'a. The arm 62a also has a tension spring 67a connected to a point on the connecting link 68a of the plate 6a. Further, a support 69 for arm 62a to 62e is preferably provided.

The answer setting plate 7a, as the other plates 7b to 7e, is connected or formed as unitary at the bottom of the answer actuating means 4a, and vertically displaceable together therewith. The plate 7a is partially cutout to form a predetermined configuration different from that of other plates 7b to 7e, as best seen from FIG. 2.

The movable board 8 has a series of wedge-shaped posts 81a to 81e along, for example, the left-hand longitudinal side. Just under the position of posts 81a to 81e, there are a series of beams 82a to 82e which laterally extend away from the board 8 to form the supports 83a to 83e. The free ends of said supports 83a to 83e are formed with comb-like configurations, preferably having three upright teeth 84a to 84e, the space between each two adjacent teeth 84a . . . being readily to support one of the said rods 9 and 9'.

Further, the board 8 is provided with rollers 85, preferably in number of four at four corners. The rollers 85 are freely movable on the rails 86 disposed on the bottom of case 1. And stop members 87 are provided at terminal ends of the said rails 86 to restrict the said rollers 85 from moving the to utmost extent.

Figure 2:
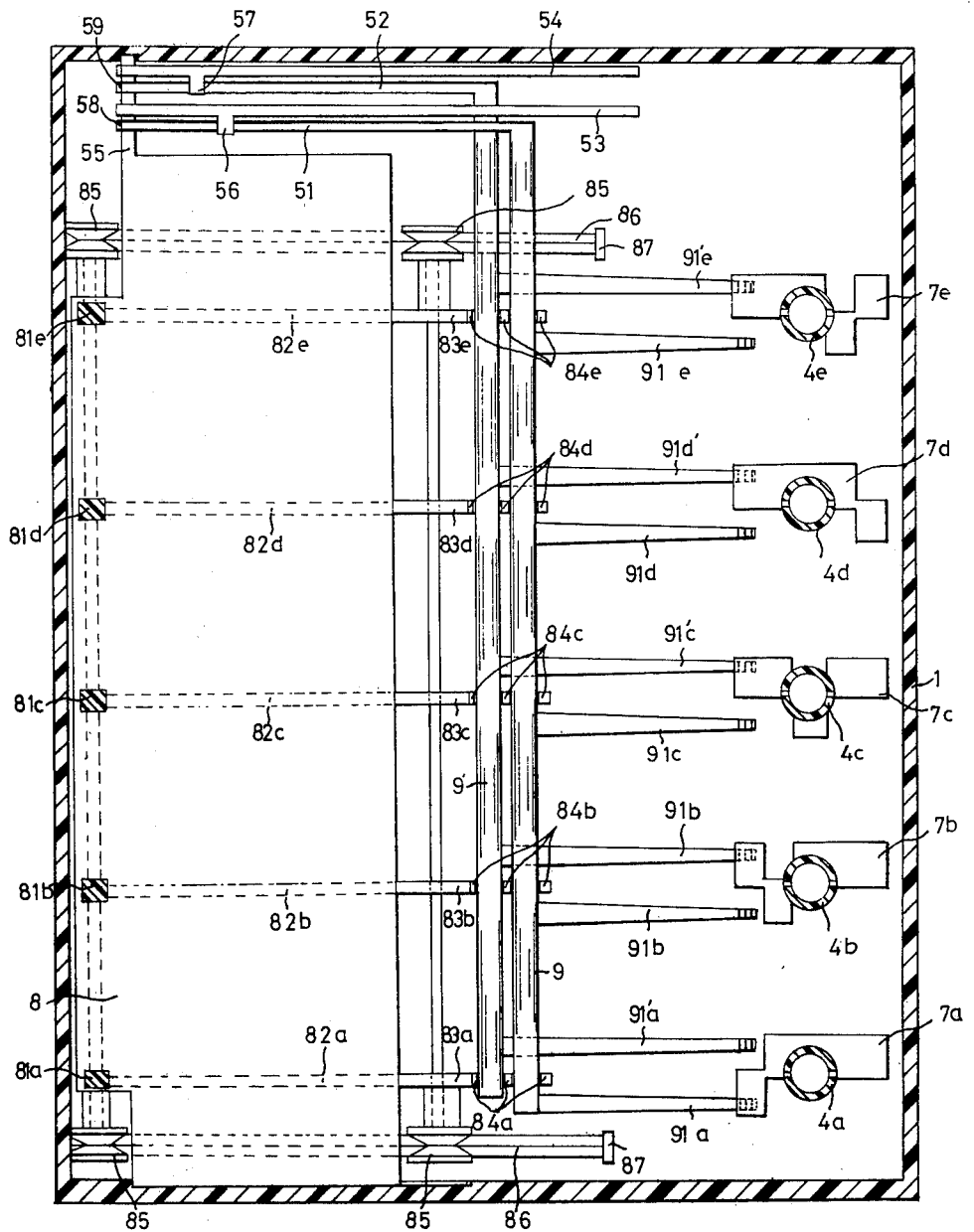
FIG. 2 is a top view with cross section along the line II—II of FIG. 1.

A pair of rods 9 and 9' are transversely supported at the free ends, namely, the comb-like portions of the supports 83a to 83e. Each of the rods 9 and 9' has radially extending a series of L-shaped levers 91a and 91'a to 91e and 91'e, respectively, at the position corresponding to the answer setting plates 7a to 7e. The rods 9 and 9' are connected at their ends to affirmative indicator actuating lever 51 and negative indicator actuating lever 52, respectively, as shown in FIG. 2.

The affirmative indicator 53 and negative indicator 54 are pivotably secured at one end by means of a rod pin 55. The said indicators 53 and 54 are provided with a respective sidewards guide means 56 and 57 at appropriate positions. Further, the said actuating levers 51 and 52 are provided with a respective stop means 58 and 59 at their free ends, respectively.

In operation, one first of all selects a card 2 and places it on the central top 13 of the case 1, for example, by inserting the left-hand side at first to match the plurality of notches 21a to 21e with corresponding guide pins 65a to 65e, and in this manner, the guide pins 65a to 65e are actuated to be displaced into the corresponding notch, and hence in turn to displace the question setting plates 6a to 6e in place. So that when the card 2 of different notches arrangement is employed, the horizontal position of said plates 6a to 6e is varied.

Now, in order to answer the question "Who prefers what?" on card 2 as illustrated, suppose one operates the switch 3a corresponding to the subject of "Monkey", at which time, the question setting plate 6a is pressed by the wing of switch 3a. As soon as the guide pins 65a to 65e are set by the card 2, then only one of the ribs under each plate 6a to 6e is aligned with corresponding wedge-shaped posts 81a to 81e. Suppose the aligned rib is 64a, so that when the plate 6a is pressed down, the rib 64a is unavoidably selected to cooperate with the post 81a, in other words, to displace the post 81a in position depending on the inclined configuration of said rib 64a. In turn, the board 8 will be moved and displace the rods 9 and 9' together with their L-shaped levers 91a to 91e and 91'a to 91'e to appropriate positions.

Subsequently, when one pushes the rod 4a corresponding to the object of "Banana", the answer setting plate 7a is pressed down and the cutout thereof will let the vertical portion of the lever 91'a stand still while the vertical portion of the lever 91a is pressed by the plate 7a, as shown in FIG. 1.

As soon as the lever 91a is pressed down, the rod 9 is thus rotated to raise up the actuating rod 51 which in turn lifts the affirmative indicator 53 at its guide means 56 until the latter is stopped by stop means 58, so that an affirmative indication of the answer is given. On the contrary, if the answer is wrong, in other words, any one of the rods 4b to 4e is pushed, since the configuration pattern of the plate 7 is different, the lever 91a will stand still while the lever 91'a is pressed down. In this case, a negative indication of answer will be given by the similar action through the rod 9' and actuating lever 52.

When the pressure on rod 4a is released, the rod 4a together with the plate 7a will rise to the original position by means of the force of spring coils 41a, and the indicator 53 will be received down through the slot 11.

The operation can be repeated in this way, and the card 2 may be changed as desired.

The above embodiment is given only for illustrative purpose and not by the way of limitation. Any variations and modifications evident to those skilled in the art will fall within the scope of the attached claims.

What we claim is:

1. An educational toy comprising a case, a plurality of changeable question and answer combination cards with notched longitudinal edges, a series of question actuating means and a series of corresponding answer actuating means, an indication mechanism composed of an affirmative indicator and a negative indicator, a series of question setting plates horizontally displaceable arranged beneath the corresponding question actuating means and having at their undersides at least two ribs with different inclined bottom surfaces, a series of answer setting plates connected at the bottoms of the corresponding answer actuating means and vertically displaceable together therewith, a movable board having a series of wedge-shaped posts along one side to be in selective cooperation with one of the said inclined ribs to set the position of the board and a series of supports laterally extended away from the board, and a pair of rods transversely supported at the free ends of the said supports and each having radially extended a series of L-shaped levers to be in selective cooperation with the said answer setting plates so as to raise up either the said affirmative indicator or the said negative indicator.

2. The educational toy as set forth in claim 1, further comprising a series of pivotably movable arms, at their free ends each being provided with an upwardly raised guide pin and two downwardly extended restriction pins.

3. The educational toy as set forth in claim 1, wherein the question actuating means is in the form of a wing-type switch.

4. The educational toy as set forth in claim 1, wherein the answer actuating means is in the form of a hollow push rod with a compressible spring coil retained therein.

5. The educational toy as set forth in claim 4, wherein the wall of the said rod is provided with two longitudinally extended slits opposite to each other, and a pressed bar is passed through the said two slits to restrict the lower end of the said spring coil.

6. The educational toy as set forth in claim 1, wherein each answer setting plate is partially cutout to form a configuration different from the other plates.

7. The educational toy as set forth in claim 1, wherein the movable board is provided with rollers to be freely moved on rails.

8. The educational toy as set forth in claim 1, wherein the free end of each said support is formed with comb-like configuration, the space between each two adjacent upright comb teeth being adapted to support one of the said rods.

9. The educational toy as set forth in claim 7, wherein a stop member is provided at the terminal end of each rail to restrict movement of the rollers.

* * * * *